Feb. 26, 1924.　　　　　　　　　　　　　　　　　　1,484,727
D. W. LOVE
COMBINED STOPCOCK AND DRAIN VALVE
Filed Dec. 20, 1922

Inventor
D. W. Love.
By Lacey & Lacey, Attorneys

Patented Feb. 26, 1924.

1,484,727

UNITED STATES PATENT OFFICE.

DANA W. LOVE, OF JOHNSON CITY, TENNESSEE.

COMBINED STOPCOCK AND DRAIN VALVE.

Application filed December 20, 1922. Serial No. 608,046.

*To all whom it may concern:*

Be it known that I, DANA W. LOVE, citizen of the United States, residing at Johnson City, in the county of Washington and State of Tennessee, have invented certain new and useful Improvements in Combined Stopcocks and Drain Valves, of which the following is a specification.

This invention relates to a combined stop cock and drain valve, and seeks, as one of its principal objects, to provide a valve which may be operated to cut off the supply of water to a house or the like and simultaneously open a drain passage for draining the water from the system in the house so as to prevent freezing or in order to allow of repairs to the water system of the house.

The invention has as a further object to provide a device wherein the valves thereof may be readily reground, removed or renewed.

The invention has as a still further object to provide a device which will be characterized by structural simplicity and which, in practical use, will prove entirely efficient and dependable.

Other and incidental objects will appear hereinafter.

Figure 1:
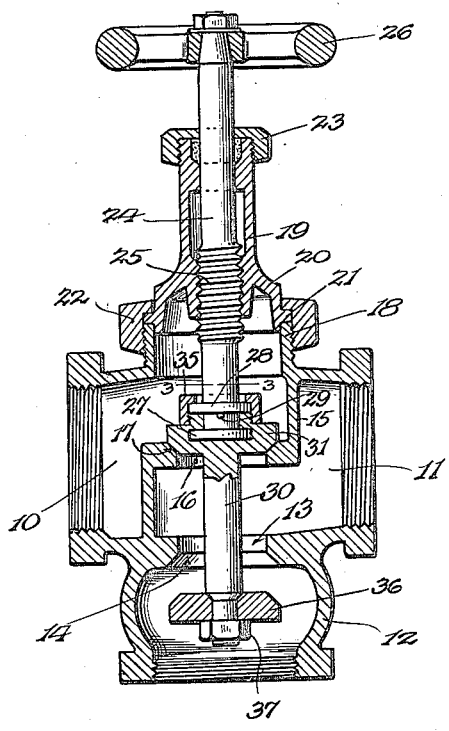
Figure 1 is a vertical sectional view through my improved stop cock and drain valve.
Figure 2:
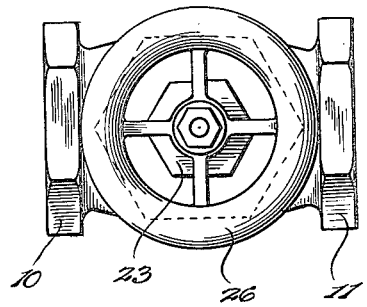
Figure 2 is a top plan view of the device.
Figure 3:
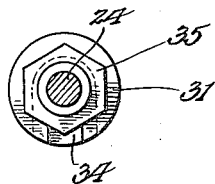
Figure 3 is a detail sectional view on the line 3—3 of Figure 1.
Figure 4:
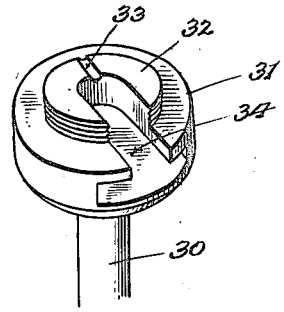
Figure 4 is a detail perspective view of the stop valve of the device.

In carrying the invention into effect, I employ a shell having an inlet passage 10, an outlet passage 11 and a drain passage 12 depending from the bottom wall of the shell. Formed in said bottom wall axially of the passage 12 is a drain port 13 at the lower end of which is a beveled valve seat 14, and traversing the shell medially thereof is a diaphragm 15 having a port 16 for establishing communication between the inlet and outlet passages of the shell. The port 16 registers with the port 13, the two ports being preferably of like diameter, and formed on the diaphragm at the upper end of the port 16 is a beveled valve seat 17. Rising from the shell in concentric relation to the axis of the ports 13 and 16, is an annular flange 18, and sustained by the flange is a bonnet 19 provided near its lower end with an apron 20 fitting in said flange. The apron is formed with an annular lip 21 resting upon the upper end edge of said flange and threaded upon the flange is a nut 22 engaging over said lip clamping the bonnet in position closing the shell at its upper side.

At its upper end, the bonnet 19 is preferably provided with a gland 23 and extending through said gland is a spindle 24 having threaded engagement with the bonnet, as indicated at 25, the pitch of said threads being relatively steep so that the valve heads carried by the spindle, as will be later described, may be quickly opened or closed. Fixed to the upper end of the spindle is a hand wheel 26 and formed on the spindle at its lower end are spaced annular flanges 27 and 28 respectively, the spindle being provided immediately beneath the flange 28 with a diametric opening 29. Coupled with the spindle is a valve stem 30 extending axially through the ports 13 and 16 and formed at its upper end with an integral stop valve head 31 beveled to engage the seat 17. Rising from said valve head is an annular boss 32 in which is provided a groove 33 and opening through one side of the valve head and through said boss is a recess or seat 34 removably accommodating the flange 27 of the spindle 24, the flange 28 of said spindle being disposed to overlie the boss 32. The flanges 27 and 28 will thus cooperate with the boss 32 for rotatably connecting the spindle with the valve stem, and threaded upon the boss 32 to surround the flange 28 is a nut 35 overhanging said flange for holding the valve centered with respect to the spindle. Fixed upon the lower end of the stem 30 is a drain valve 36 beveled to cooperate with the seat 14, and detachably connecting said valve head with the stem is a nut 37. Thus, when the spindle 24 is operated to close the valve head 31, as shown in Figure 1, the valve head 36 will be coincidently opened so that water may drain back through the port 13 and through the outlet passage 12 of the shell. On the other hand, when the spindle 24 is operated to open the valve 31, the valve head 36 will be coincidently closed so that water may flow through the shell without leakage.

Figure 5:
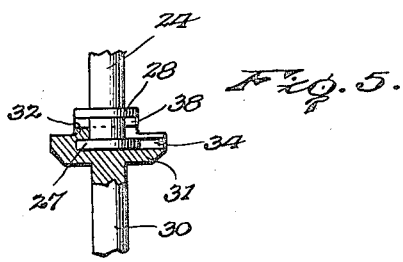
Figure 5 is a fragmentary sectional view showing the manner in which the spindle and valve stem of the device may be connected for regrinding the valves.

It is now to be observed that by removing the bonnet 19 and detaching the valve 36, the spindle 24 with the stem 30 may be removed upwardly from the shell so that the valves may be easily renewed. Furthermore, it is to be noted in this connection, that since the ports 13 and 16 are of like diameter, said ports may be readily formed at one operation and in order that the valves may be ground I provide, as shown in Figure 5, a pin 38. This pin is insertable through the opening 29 of the spindle 24 to engage in the groove 33 of the boss 32 upon the valve 31 locking the valve to the spindle. Accordingly, the spindle may then be turned for rotating either the valve 31 or the valve 36 against the seat therefor and grinding the valves. After the grinding operation is completed, the pin 38 is, of course, removed.

Having thus described the invention, what is claimed as new is:

A valve including a shell containing a port, a spindle extending into the shell axially of said port and provided at its lower end with spaced annular flanges, and a valve head controlling the flow through said port, said valve head being provided with a recess opening through its edge and with a boss on its upper side, the recess accommodating the lower flange on the spindle and the upper flange on the spindle resting on the boss, a cap having threaded engagement with said boss and surrounding the same, and an annular collar on said cap engaging the top face of said upper flange, thereby retaining the valve head upon said spindle and centering the same.

In testimony whereof I affix my signature.

DANA W. LOVE. [L. S.]